Figure 1:
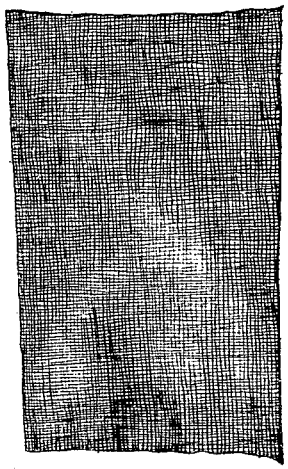

G. W. DAY.
ARTICLE OF PAPER WEARING APPAREL.

No. 65,730. Patented June 11, 1867.

Witnesses:
Ogden Griswold
M. L. Perry

Inventor:
George W. Day
by his Attorneys Buckland & Curtis

United States Patent Office.

GEORGE W. DAY, OF CHARLESTOWN, MASSACHUSETTS.

Letters Patent No. 65,730, dated June 11, 1867.

---

IMPROVEMENT IN ARTICLES OF PAPER WEARING-APPAREL.

---

The Schedule referred to in these Letters Patent and making part of the same.

---

TO ALL WHOM IT MAY CONCERN:

Be it known that I, GEORGE W. DAY, of Charlestown, in the county of Middlesex, and Commonwealth of Massachusetts, have invented a new and useful Improvement in Paper for Articles of Wearing-Apparel; and I do hereby declare that the following is a full, clear, and exact description thereof, reference being had to the accompanying drawings, making a part of this specification, in which—

Figure 1 is a plan view of a piece of paper to which my said invention has been applied.

The nature of my invention consists in embossing or stamping the surface of paper, whether plain or enamelled, which is to be used for articles of wearing-apparel, so that it shall have a negative imprint or imitation of a woven fabric, by using, as a die or stamp in the operation, the woven fabric itself applied under pressure.

In the operation of embossing or stamping in imitation of a woven fabric, a metallic die has heretofore been used either in the form of a roll, which might be electrotyped or engraved, or a flat surface die, which could also be either electrotyped or engraved. But the great objection to this mode of stamping or embossing has been that the sharp edges of the engraved or electrotyped die are soon worn off, and to renew or replace such die requires a great outlay of labor and expense. Moreover, if it is desired to change the die, or imitate different qualities of the same goods, or to imitate different kinds of goods, it is necessary to have as many dies or stamps as it is desired to have different imitations made, and that method of stamping paper, or embossing paper in imitation of woven fabrics, is attended with great expense, labor, and delay.

My method of embossing or stamping paper in imitation of a woven fabric entirely obviates these difficulties, as I can easily and quickly replace a die or new piece of fabric at very trifling labor and expense, and with little or no delay.

To enable others skilled in the art to make and use my invention, I will proceed to describe its mode of construction.

I use any paper, either plain or enamelled, which is sufficiently strong and firm to be used for articles of wearing-apparel, and place upon its surface a piece of the woven fabric which I wish to imitate, and I then apply pressure to the woven fabric and paper thus placed together sufficiently to force the threads of the woven fabric into the surface of the paper and leave upon its surface an imprint or impression. For the purpose of producing this imprint I have employed a pair of steel rolls placed horizontally, and one above the other, one of said rolls being furnished with a winch for turning it. The paper and woven fabric can be passed between the rolls in contact with each other, and if the rolls are forced together tightly enough the impression will be made upon the paper by the cloth. This operation is capable of a great variety of changes, as any woven fabric, whose texture is sufficiently firm and strong to make an impression upon paper, can be imitated with ease, and more exactly and naturally than can possibly be done with any metallic die, and that, too, at very trifling expense and labor, and with little or no delay.

All of the difficulties attendant upon the use of engraved or electrotyped surfaces to produce an imitation of the surface of a woven fabric upon paper, such as breakage, rapid deterioration, great expense, or renewal, are entirely overcome and removed by my invention, and a better imitation is obtained of any desired quality of woven fabric, or of any desired kind of fabric, than by any other known method.

It is obvious that my invention can be applied either to paper in the strip or sheet, or to paper after it has been converted into articles of wearing-apparel, without departing from the principle of its operation; and it can also be applied equally as well either to plain or enamelled paper, although I prefer to use the enamelled paper, as the plain paper is, to a certain extent, spongy or porous, and does not so well retain the impression made upon its surface, as in certain moist conditions of the atmosphere the plain paper absorbs more or less moisture, which expands or swells it so that the sharpness and distinctness are somewhat destroyed, whereas the surface of enamelled paper is hard and firm, and does not so readily absorb moisture, but to a certain extent resists it, and retains the impression made by the woven fabric much longer.

Having thus described my invention, what I claim as new, and desire to secure by Letters Patent, is—

As an article of manufacture, paper, either plain or enamelled, embossed or imprinted by means of a woven fabric applied to its surface under pressure, either before or after its conversion into articles of wearing-apparel, substantially as set forth.

GEO. W. DAY.

Witnesses:
   HENRY C. HUTCHING,
   EATON DRONE.